US009239653B2

(12) United States Patent
Chuang et al.

(10) Patent No.: US 9,239,653 B2
(45) Date of Patent: Jan. 19, 2016

(54) TOUCH PANEL AND METHOD OF FABRICATING THE SAME

(75) Inventors: Wen-Chi Chuang, New Taipei (TW);
Chia-Chun Yeh, Taipei (TW);
Yu-Ching Huang, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 716 days.

(21) Appl. No.: 13/567,103

(22) Filed: Aug. 6, 2012

(65) Prior Publication Data

US 2013/0257519 A1    Oct. 3, 2013

(30) Foreign Application Priority Data

Mar. 28, 2012 (TW) ................................. 101110785

(51) Int. Cl.
*H05K 1/09* (2006.01)
*H05K 1/00* (2006.01)
*H03K 17/96* (2006.01)
*G06F 3/041* (2006.01)
*G06F 3/044* (2006.01)

(52) U.S. Cl.
CPC ........................................ *G06F 3/044* (2013.01)

(58) Field of Classification Search
CPC ........................................................ G06F 3/044
USPC ......... 174/250, 257; 327/517; 427/97.1, 97.3; 216/13; 345/173
See application file for complete search history.

(56) References Cited

U.S. PATENT DOCUMENTS

| 4,550,221 | A  | * | 10/1985 | Mabusth ................... 178/18.06 |
| 6,887,917 | B2 | * | 5/2005  | Yang et al. ..................... 522/90 |
| 7,868,957 | B2 | * | 1/2011  | Yamazaki et al. ............. 349/43 |
| 2003/0213624 | A1 | * | 11/2003 | Cross et al. ............... 178/18.06 |
| 2004/0027339 | A1 | * | 2/2004  | Schulz .......................... 345/173 |

(Continued)

FOREIGN PATENT DOCUMENTS

| CN | 102236486 | 11/2011 |
| TW | 200602775 | 1/2006 |

(Continued)

OTHER PUBLICATIONS

"Office Action of Taiwan Counterpart Application", issued on Jun. 24, 2014, p. 1-8, in which the listed foreign references were cited.

*Primary Examiner* — Timothy Thompson
*Assistant Examiner* — Rhadames J Alonzo Miller
(74) *Attorney, Agent, or Firm* — Jianq Chyun IP Office (57) ABSTRACT

A touch panel includes a substrate, a touch-sensing circuit, and fan-out traces. The substrate has a touch-sensing region and an adjoined peripheral region. The touch-sensing circuit is disposed on the touch-sensing region. The fan-out traces are disposed on the peripheral region and electrically connected to the touch-sensing circuit. Each fan-out trace includes a first conductive line, a first dielectric layer and a second conductive line. The first conductive line is disposed on the peripheral region. The first dielectric layer is disposed on the peripheral region to cover the first conductive line, and has at least one contact window located above the first conductive line. The second conductive line is disposed on the first dielectric layer, wherein the first and the second conductive line of the same fan-out trace have the same pattern and are electrically connected through the contact window.

16 Claims, 7 Drawing Sheets

(56) References Cited

U.S. PATENT DOCUMENTS

| | | | |
|---|---|---|---|
| 2005/0069718 A1* | 3/2005 | Voss-Kehl et al. | 428/447 |
| 2006/0269737 A1* | 11/2006 | Yasuda et al. | 428/323 |
| 2007/0063876 A1* | 3/2007 | Wong | 341/34 |
| 2007/0258035 A1* | 11/2007 | Wang | G02F 1/136285 349/187 |
| 2008/0007534 A1* | 1/2008 | Peng et al. | 345/173 |
| 2008/0054785 A1* | 3/2008 | Hayashi | 313/483 |
| 2008/0135282 A1* | 6/2008 | Jonnalagadda et al. | 174/260 |
| 2008/0176042 A1* | 7/2008 | Nashiki et al. | 428/172 |
| 2008/0218670 A1* | 9/2008 | Kumai | 349/114 |
| 2008/0231606 A1* | 9/2008 | Moon | 345/173 |
| 2008/0264699 A1* | 10/2008 | Chang et al. | 178/18.01 |
| 2009/0046077 A1* | 2/2009 | Tanaka et al. | 345/174 |
| 2009/0051274 A1* | 2/2009 | Hayashi | 313/504 |
| 2009/0096760 A1* | 4/2009 | Ma et al. | 345/174 |
| 2009/0115321 A1* | 5/2009 | Hayashi | 313/504 |
| 2009/0160819 A1* | 6/2009 | Sasaki et al. | 345/174 |
| 2010/0110023 A1* | 5/2010 | Chien et al. | 345/173 |
| 2010/0225612 A1* | 9/2010 | Ishizaki et al. | 345/174 |
| 2010/0227426 A1* | 9/2010 | Wang et al. | 438/34 |
| 2011/0032209 A1* | 2/2011 | Kim | 345/174 |
| 2011/0080376 A1* | 4/2011 | Kuo et al. | 345/177 |
| 2011/0128257 A1* | 6/2011 | Kim | 345/175 |
| 2011/0262631 A1* | 10/2011 | Lee | G06F 3/044 427/123 |
| 2011/0298756 A1* | 12/2011 | Kim et al. | 345/175 |
| 2012/0001169 A1* | 1/2012 | Yamazaki | 257/43 |
| 2012/0162104 A1* | 6/2012 | Chang et al. | 345/173 |
| 2012/0217516 A1* | 8/2012 | Hatano et al. | 257/88 |
| 2012/0249436 A1* | 10/2012 | Choi et al. | 345/173 |
| 2013/0100047 A1* | 4/2013 | Liao | G06F 3/044 345/173 |

FOREIGN PATENT DOCUMENTS

| | | |
|---|---|---|
| TW | 200743210 | 11/2007 |
| TW | 200919732 | 5/2009 |
| TW | 201100905 | 1/2011 |
| TW | 201137714 | 11/2011 |

* cited by examiner

TOUCH PANEL AND METHOD OF FABRICATING THE SAME

CROSS-REFERENCE TO RELATED APPLICATION

This application claims the priority benefit of Taiwan application serial no. 101110785, filed on Mar. 28, 2012. The entirety of the above-mentioned patent application is hereby incorporated by reference herein and made a part of this specification.

BACKGROUND OF THE DISCLOSURE

1. Field of the Disclosure

The present invention relates to a touch panel and a manufacturing method thereof, and particularly to an added-on touch panel and a manufacturing method thereof.

2. Description of Related Art

In recent years, digital information and wireless mobile communication technology are dramatically developed. To meet current demands on portable, compact and to be user-friendly, most of information technology (IT) products such as mobile phones, handheld PC, personal digital assistances (PDA), smart phones or the like are now using a touch panel as an input device instead of a conventional input device such as a keyboard or a mouse. Besides the convenience, and also because of the intuitive operation, the touch inputting technology becomes a popularized human-machine interface and multi-media interactions, and thus is becoming greatly concerned and developed.

Based on different sensing principles, touch panels can be generally categorized into resistive touch panels, capacitive touch panels, optical touch panels, acoustic-wave touch panels, electromagnetic touch panels and the like, wherein because having the advantages of fast response speed, favorable reliability and durability, the capacitive touch panels have been extensively applied to electronic devices. According to different structures and manufacturing methods, the capacitive touch panels can be further classified into on-cell types, in-cell types and added-on types. For on-cell type touch panels and in-cell type touch panels, touch functions are directly integrated into manufacturing processes of the panels, wherein sensing series are disposed on the outer surface or the inner surface of the display panel. The added-on touch panels usually have sensing series fabricated on another substrate, and the substrate on which the sensing series have been formed is then attached to the outer surface of the display panel.

The conventional added-on touch panels include a substrate, touch-sensing circuit and fan-out traces. The substrate has a touch-sensing region and a peripheral region surrounding the touch-sensing region, so that the touch-sensing circuit is located on the touch-sensing region of the substrate and the fan-out traces are located on the peripheral region of the substrate. One end of the fan-out trace is electrically connected to the touch-sensing circuit, and another end of the fan-out trace is electrically connected to an integrated circuit (IC) attaching area located on the peripheral region of the substrate. When the integrated circuit is attached to the substrate, the integrated circuit is electrically connected to the touch-sensing circuit through the fan-out traces.

However, disposing a plurality of fan-out traces on the peripheral region of the substrate requires configuring specific gaps among the fan-out traces. If line width and the space between the lines of the fan-out trace are too large, the area of peripheral region would be increased and it may not comply with the demand of slim border design. However, if the line width and the space between the lines of the fan-out trace are too small, then the resistance of the fan-out trace would be increased and the sensitivity of the touch panel may be affected. For instance, when both the line width and the space are 30 μm, the resistance of the fan-out trace is high enough to affect the sensitivity of the touch panel.

SUMMARY OF THE DISCLOSURE

The present invention provides a touch panel, capable of reducing the resistance of the fan-out trace, and a fabrication method thereof.

To embody the present invention, a touch panel is provided herein. The touch panel includes a substrate, a touch-sensing circuit and a plurality of fan-out traces. The substrate has a touch-sensing region and a peripheral region adjacent to the touch-sensing region. The touch-sensing circuit is disposed on the touch-sensing region of the substrate. The fan-out traces are disposed on the peripheral region of the substrate and electrically connected to the touch-sensing circuit. Each of the fan-out traces includes a first conductive line, a first dielectric layer and a second conductive line. The first conductive line is disposed on the peripheral region of the substrate. The first dielectric layer is disposed on the peripheral region of the substrate to cover the first conductive line, wherein the first dielectric layer has at least one contact window located above the first conductive line. The second conductive line is disposed on the first dielectric layer, wherein the first conductive line and the second conductive line of the same fan-out trace are electrically connected to each other through the contact window, and the first conductive line and the second conductive line which are electrically connected to each other substantially have the same pattern.

The present invention further provides a fabricating method of a touch panel including the following fabricating steps: providing a substrate, wherein the substrate has a touch sensing region and a peripheral region adjacent to the touch sensing region; forming a plurality of first conductive lines on the peripheral region of the substrate; forming a plurality of first sensing series electrically insulated from each other on the touch-sensing region of the substrate; forming a dielectric layer on the peripheral region of the substrate to cover a portion of the first conductive lines, wherein the dielectric layer has at least one contact window located above the first conductive lines; forming a second sensing series electrically insulated from each other on the touch-sensing region of the substrate, wherein the dielectric layer is at least disposed at intersections of the first sensing series and the second sensing series, so that the first sensing series and the second sensing series are electrically insulated; and forming a plurality of second conductive lines on the dielectric layer, wherein the first conductive line and the second conductive line of the same fan-out trace are electrically connected to each other through the contact windows, and the first conductive line and the second conductive line which are electrically connected to each other substantially have the same pattern.

According to one exemplary embodiment of the present invention, the touch-sensing circuit includes a plurality of first sensing series electrically insulated from each other, a plurality of second sensing series electrically insulated from each other and a second dielectric layer. The second dielectric layer is at least disposed at intersections of the first sensing series and the second sensing series, so that the first sensing series and the second sensing series are electrically insulated.

According to one exemplary embodiment of the present invention, the first dielectric layer and the second dielectric layer belong to the same material layer.

According to one exemplary embodiment of the present invention, each of the first sensing series extends from the touch-sensing region to the peripheral region to cover a portion of the first conductive lines, and each of the second sensing series extends from the touch-sensing region to the peripheral region to cover a portion of the second conductive lines.

According to one exemplary embodiment of the present invention, the touch panel further includes a black matrix disposed on the peripheral region of the substrate, wherein the fan-out traces are disposed on the black matrix.

According to one exemplary embodiment of the present invention, the touch panel further includes a buffer layer disposed on the substrate, wherein the black matrix is disposed on the buffer layer.

According to one exemplary embodiment of the present invention, the touch panel further includes a third dielectric layer, wherein the third dielectric layer covers the substrate and the black matrix, and the first conductive lines are disposed on the third dielectric layer.

According to one exemplary embodiment of the present invention, the touch panel further includes a protective layer covering the touch-sensing circuit and the fan-out traces.

According to one exemplary embodiment of the present invention, the first conductive lines and the second conductive lines are respectively fabricated by a two-step photolithography and etching process, and the two-step photolithography and etching process uses the same photo-mask.

According to one exemplary embodiment of the present invention, the fabricating method of a touch panel further includes forming a black matrix on the peripheral region of the substrate, wherein the fan-out traces are disposed on the black matrix.

According to one exemplary embodiment of the present invention, the fabricating method of a touch panel further includes forming a buffer layer on the substrate, wherein the black matrix is disposed on the buffer layer.

According to one exemplary embodiment of the present invention, the fabricating method of a touch panel further includes forming a third dielectric layer, wherein the third dielectric layer covers the substrate and the black matrix, and the first conductive lines are disposed on the third dielectric layer.

According to one exemplary embodiment of the present invention, the fabricating method of a touch panel further includes forming a protective layer covering the touch-sensing circuit and the fan-out traces.

According to one exemplary embodiment of the present invention, the first dielectric layer has a plurality of contact windows located above the first conductive lines to expose two ends of each of the first conductive lines.

In light of the above, under the condition of without significantly increasing the manufacturing costs, the resistance of the fan-out traces is effectively decreased and the sensitivity of the touch panel of the present invention can also be greatly improved.

In order to make the aforementioned properties and advantages of the invention more comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF THE EMBODIMENTS

Figure 1:
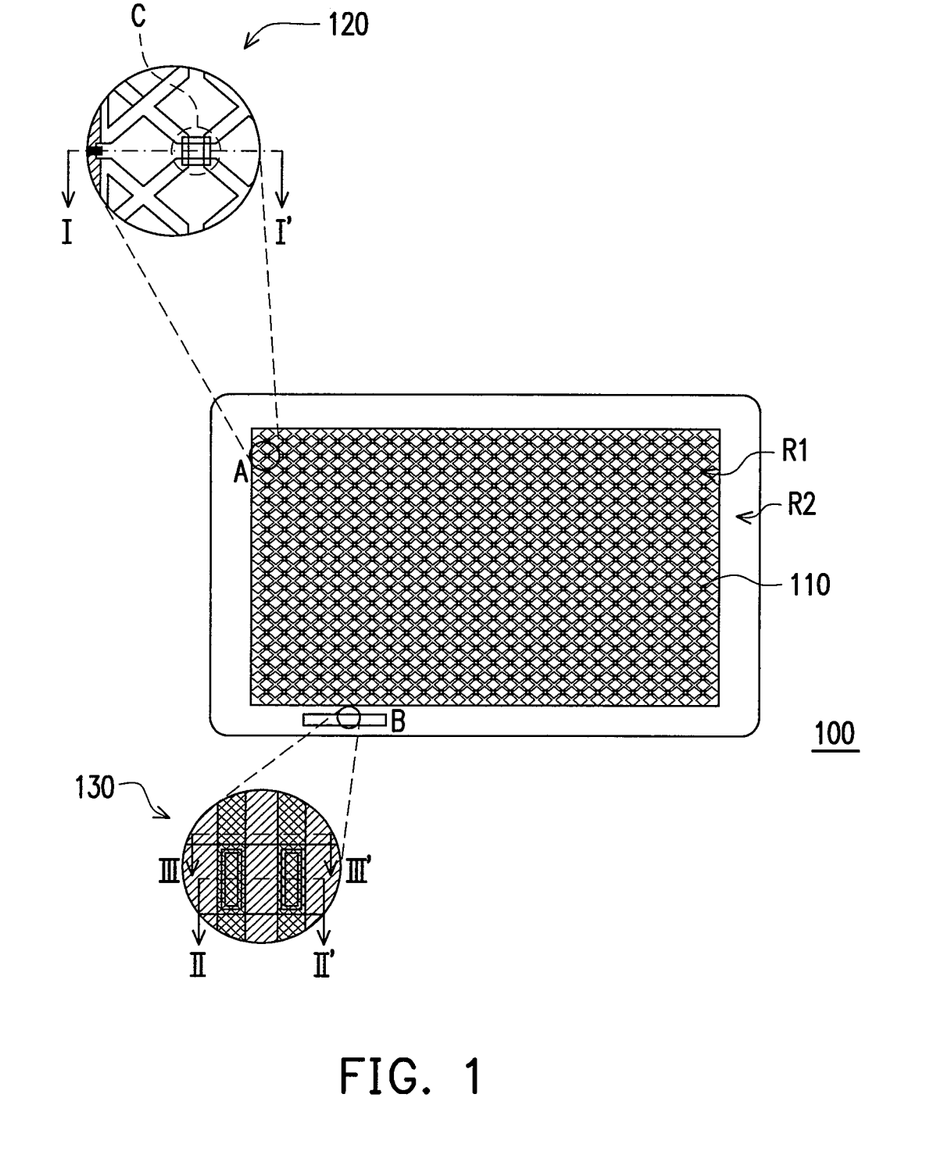
FIG. 1 is a schematic top view illustrating a touch panel according to one exemplary embodiment of the present invention.

FIG. 1 is a schematic top view illustrating a touch panel according to one exemplary embodiment of the present invention. Referring to FIG. 1, a touch panel 100 of the present embodiment includes a substrate 110, a touch-sensing circuit 120 and a plurality of fan-out traces 130. The substrate 110 has a touch-sensing region R1 and a peripheral region R2 adjacent to the touch-sensing region R1. The touch-sensing region R1 is substantially enclosed by the peripheral region R2, for example. In the embodiment, the substrate 110 may be a rigid substrate, a flexible substrate or a display panel, and the substrate 110 can be made of glass, quartz, organic polymer, or any other appropriate material.

In the embodiment, the touch-sensing region R1 of the substrate 110 can be a rectangular region, and the peripheral region R2 can be a hollow rectangular region surrounding and adjacent to the touch-sensing region R1. In other embodiments of the present invention, the shape of the touch-sensing region R1 may be circular, elliptical, polygonal or other shape, and the shape of the peripheral region R2 can be changed according to the touch-sensing region R1, and the present invention is not limited thereto.

The touch-sensing circuit 120 is disposed in the touch-sensing region R1 of the substrate 110, and the fan-out traces 120 are disposed in the peripheral region R2 of the substrate 110 and electrically connected to the touch-sensing circuit 120. The touch-sensing circuit 120 and the fan-out traces 130 are illustrated in detailed as follows accompanying with FIG. 2A to FIG. 2G, FIG. 3A to FIG. 3G and FIG. 4A to FIG. 4G.

FIG. 2A to FIG. 2G are cross-sectional schematic views taking along section line I-I' of region A depicted in FIG. 1 and illustrating a fabricating process. FIG. 3A to FIG. 3G are cross-sectional schematic views taking along section line II-II' of region B depicted in FIG. 1 and illustrating a fabricating process. FIG. 4A to FIG. 4G are cross-sectional schematic views taking along section line III-III' of region B depicted in FIG. 1 and illustrating a fabricating process. The region A of FIG. 1 shows one of the border regions between the touch-sensing region R1 and the peripheral region R2, and the enlarged view of the region A shows the connection between the fan-out traces 130 and the touch-sensing circuit 120. The region B of FIG. 1 is the peripheral region R2, wherein the region cut by the section line II-II' is the attaching zone of the peripheral region R2 with the circuit board, and the region cut by the section line III-III' is the attaching zone of the peripheral region R2 without the circuit board.

Referring to FIG. 1, FIG. 2A, FIG. 3A and FIG. 4A, first, the substrate 110 is provided, wherein the substrate 110 has a touch-sensing region R1 and a peripheral region R2 adjacent to the touch-sensing region R1, as shown in FIG. 1. Next, a buffer layer 150 is formed on the substrate 110 and a black matrix 140 is formed on the buffer layer 150. Herein the black matrix 140 is disposed corresponding to the peripheral region R2. It should be noted that in the fabricating method of a touch panel of the present embodiment, the step of forming the buffer layer 150 may be omitted, and the black matrix 140 may be directly formed on the peripheral region R2 of the substrate 110.

Figure 2A:
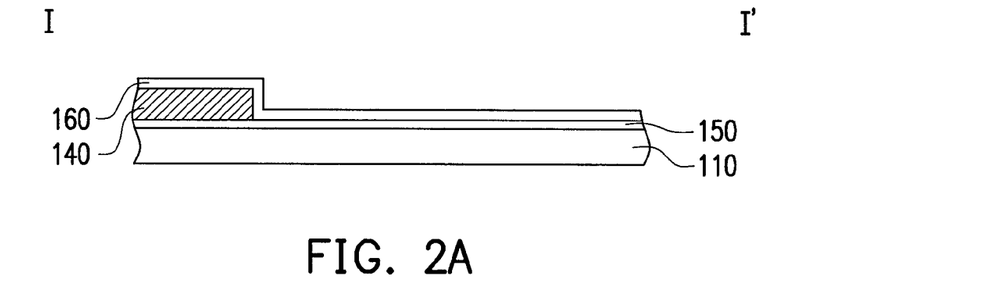
FIG. 2A to FIG. 2G are cross-sectional schematic views taking along section line I-I' of region A depicted in FIG. 1 and illustrating a fabricating process.
Figure 3A:
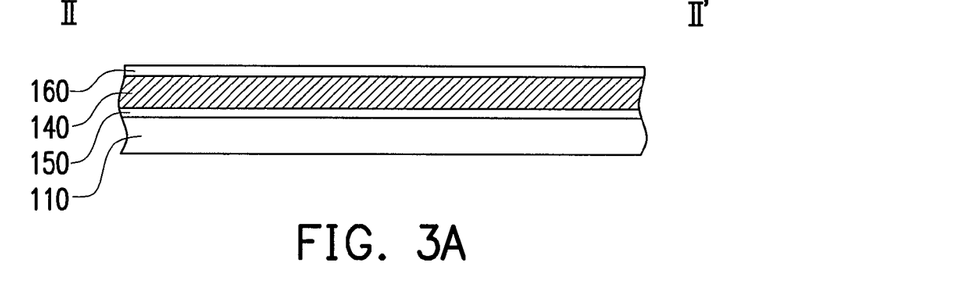
FIG. 3A to FIG. 3G are cross-sectional schematic views taking along section line II-II' of region B depicted in FIG. 1 and illustrating a fabricating process.
Figure 4A:
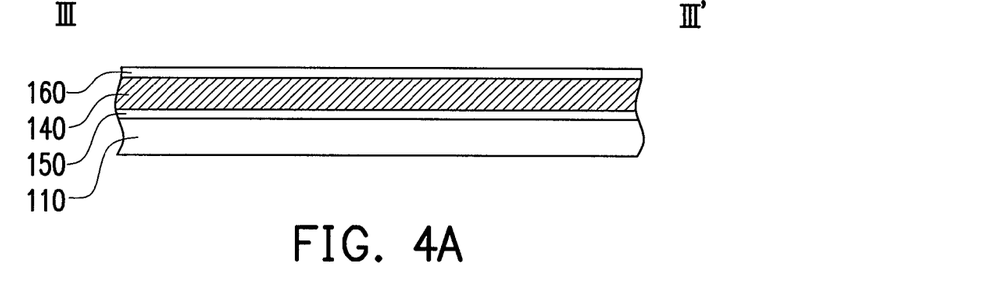
FIG. 4A to FIG. 4G are cross-sectional schematic views taking along section line III-III' of region B depicted in FIG. 1 and illustrating a fabricating process.

In the present embodiment, the black matrix 140 is made of a material having a good light shielding property such as chromium (Cr), black resin or the like, for example. Moreover, in the embodiment, a third dielectric layer 160 can be selectively fabricated on the substrate 110 and the black matrix 140. In detailed, if the material of the black matrix 140 is chromium, the third dielectric layer 160 can effectively avoid the short circuit caused by the black matrix 140 and the follow-up conductive thin film, and if the material of the black matrix 140 is black resin, the fabricating of the third dielectric layer 160 can be omitted.

Figure 2B:
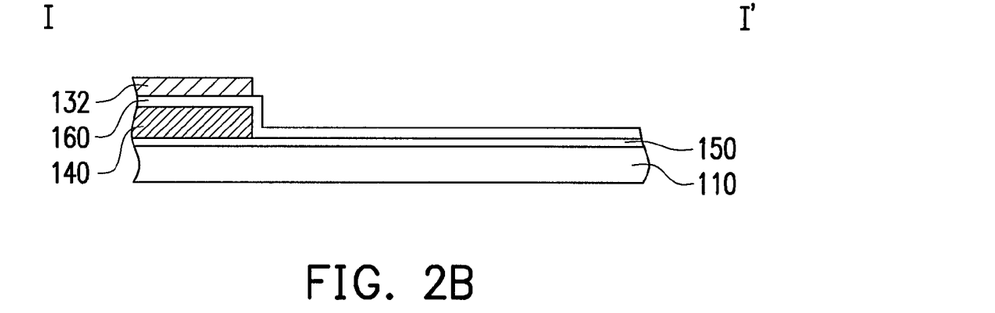
Figure 3B:
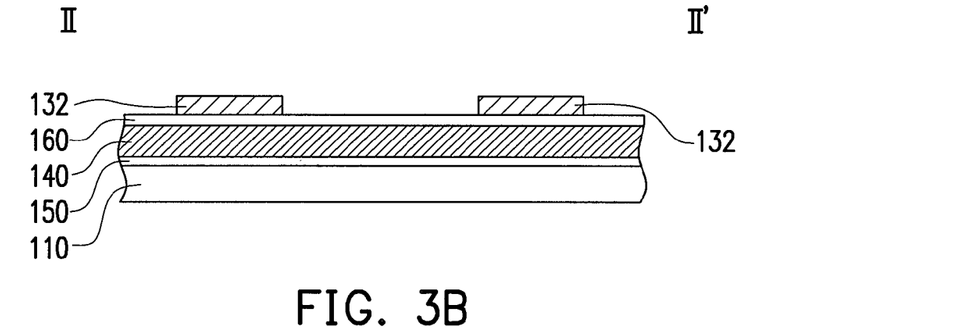
Figure 4B:
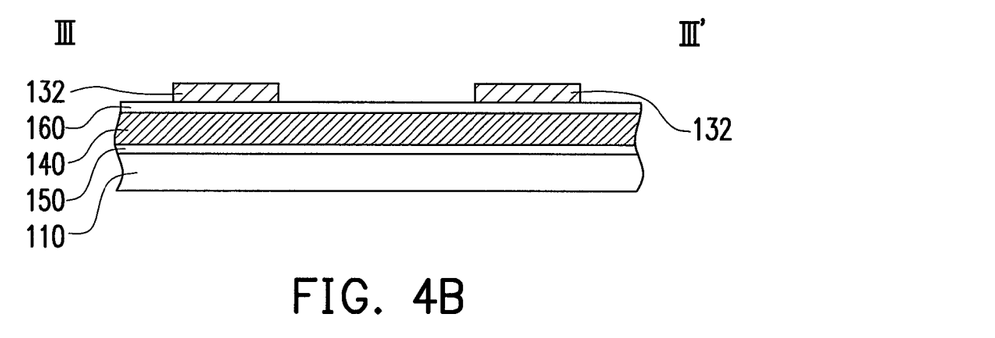

Then, referring to FIG. 2B, FIG. 3B and FIG. 4B, a plurality of first conductive lines 132 are formed on the peripheral region R2 of the substrate 110, so that the first conductive lines 132 are disposed on the third dielectric layer 160 and the black matrix 140. The first conductive lines 132 and the black matrix 140 are overlapped, for example.

Figure 2C:
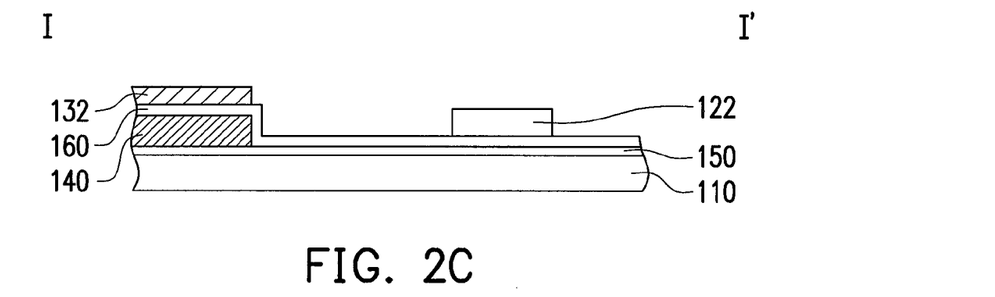
Figure 3C:
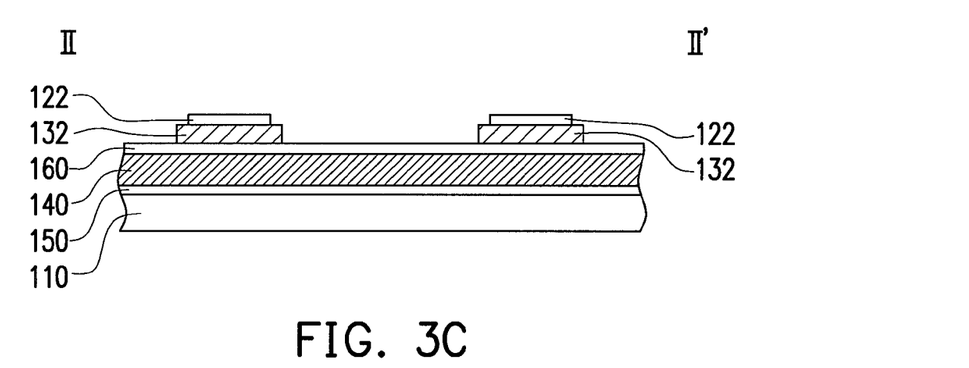
Figure 4C:
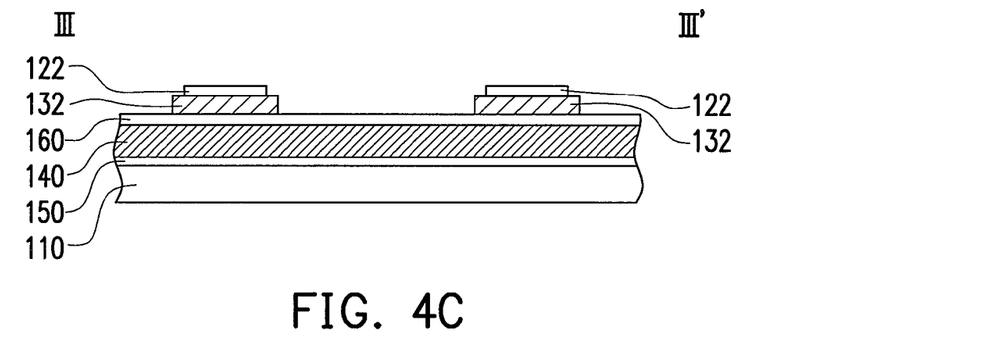

After that, referring to FIG. 2C, FIG. 3C and FIG. 4C, a plurality of first sensing series 122 electrically insulated from each other are formed on the touch-sensing region R1 of the substrate 110, wherein the first sensing series 122 respectively extend from the touch-sensing region R1 of the substrate 110 to the peripheral region R2 of the substrate 110 so as to cover a portion of the first conductive lines 132 (as shown in upper left part of the region A of FIG. 1), in order that the first conductive lines 132 are electrically connected to the corresponding first sensing series 122, respectively.

Figure 2D:
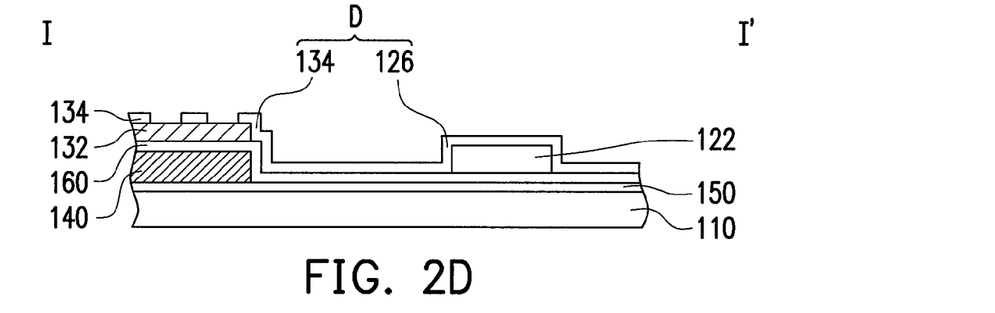
Figure 3D:
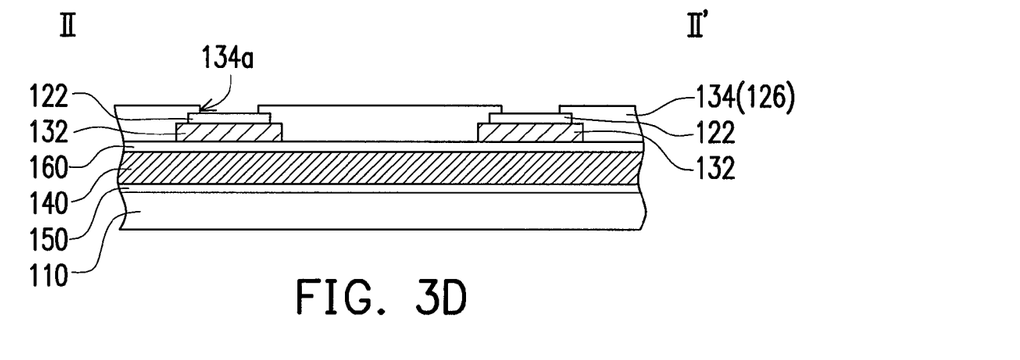
Figure 4D:
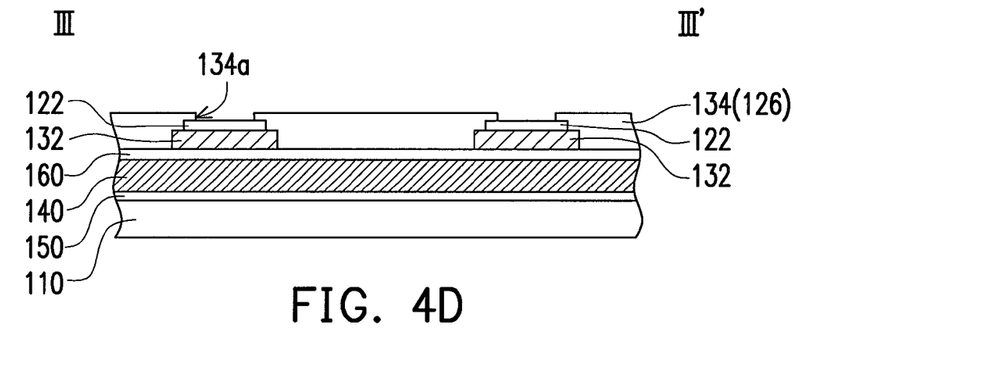

And then, referring to FIG. 2D, FIG. 3D and FIG. 4D, a dielectric layer D is formed on the substrate 110. The dielectric layer D includes a first dielectric layer 134 and a second dielectric layer 126, wherein the first dielectric layer 134 is disposed on the peripheral region R2 of the substrate 110 and covers a portion of the first conductive lines 132, and the first dielectric layer 134 has at least one contact windows 134a located above the first conductive lines 132. In the embodiment, the contact windows 134a are formed above the region where the first conductive line 132 and the first sensing series 122 are overlapped, so as to expose a portion of the first sensing series 122. In other embodiments, the contact windows 134a can be formed at a region which is beyond the region where the first conductive line 132 and the first sensing series 122 are overlapped, so that a portion of the first conductive lines 132 is directly exposed. Note that each of the first conductive lines 132 needs to correspond to at least a contact window 134a. In addition, the second dielectric layer 126 is formed on the touch-sensing region R1 of the substrate 110 and covers at least a portion of the first sensing series 122. In the embodiment, the first dielectric layer 134 and the second dielectric layer 126 belong to the same material layer (i.e., the dielectric layer D).

Figure 2E:
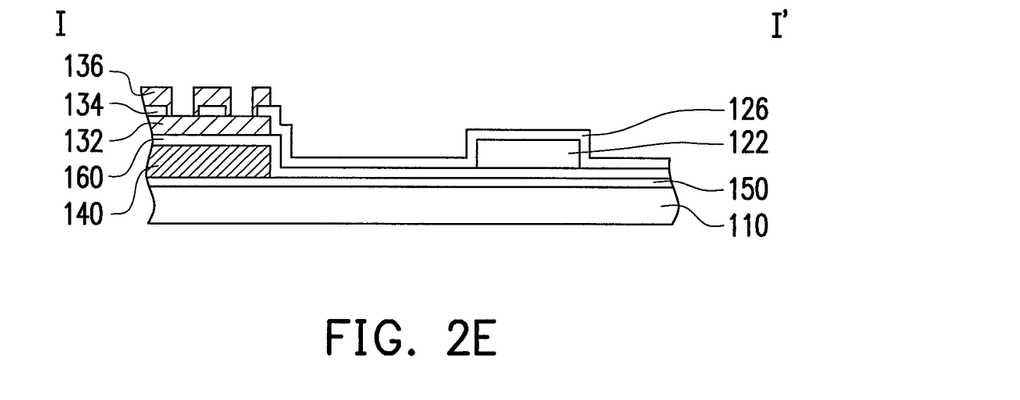
Figure 3E:
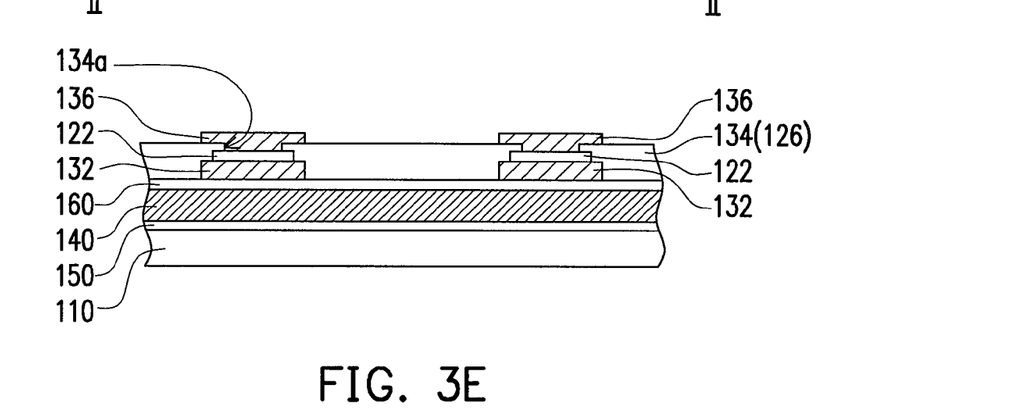
Figure 4E:
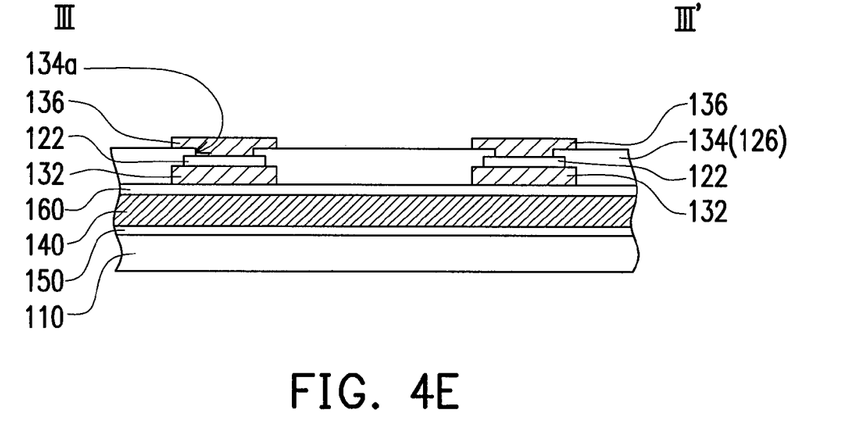

Then, referring to FIG. 2E, FIG. 3E and FIG. 4E, a plurality of second conductive lines 136 are formed on the first dielectric layer 134, and the second conductive lines 136 are located above the first conductive lines 132. In the embodiment, the first conductive lines 132 and the second conductive lines 136 are respectively fabricated by a two-step photolithography and etching process, and the two-step photolithography and etching process uses the same photo-mask. Since the first conductive lines 132 and the second conductive lines 136 are fabricated by using the same photo-mask, the first conductive lines 132 and the second conductive lines 136 substantially have the same pattern in region B as shown in FIG. 3E. It should be noted that it is unnecessary to make an extra photo-mask during the fabricating process of the second conductive lines 136 and the same photo-mask used in the fabricating process of the first conductive lines 132 is used, thus fabrication of the second conductive lines 136 may not cause too much manufacturing cost.

In the embodiment, the first conductive line 132 and the second conductive line 136 of the same fan-out trace 130 are electrically connected to each other through one or more contact windows 134a, as shown in FIG. 3E and FIG. 4E. More specifically, if the first conductive line 132 and the second conductive line 136 of the same fan-out trace 130 are required to be electrically connected to each other in order to reduce the overall resistance of the fan-out trace 130, they are electrically connected to each other through the contact window 134a corresponding to the two ends of the first conductive line 132 and the second conductive line 136. Certainly, in the embodiment, through more of the contact windows 134a arranged along the extending direction of the first conductive line 132 and the second conductive line 136, the first conductive line 132 and the second conductive line 136 can also be electrically connected to each other. In other embodiments, the first conductive line 132 and the second conductive line 136 can be electrically connected to each other through a single contact window 134a, and the single contact window 134a is, for example, a tripe contact window, and the extending direction of the single contact window 134a is the same as the extending direction of the first conductive line 132 and the second conductive line 136, so that the first conductive line 132 and the second conductive line 136 have a large area of contact.

After the forming of the second conductive lines 136, fabrication of the fan-out traces 130 is initially completed. In other words, in the embodiment, each of the fan-out traces 130 includes a first conductive line 132, a first dielectric layer 134 and a second conductive line 136, and the first dielectric layer 134 and a second conductive line 136 of the same fan-out trace 130 are electrically connected through one or more contact windows 134a.

Figure 2F:
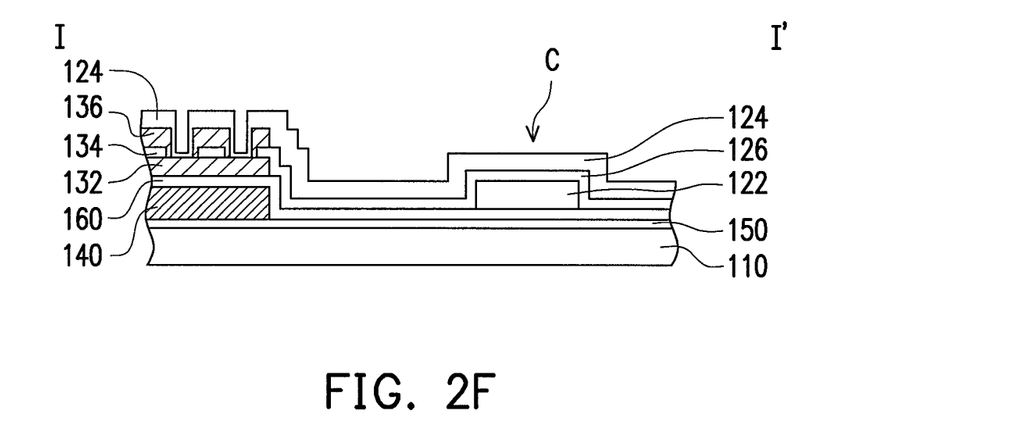
Figure 3F:
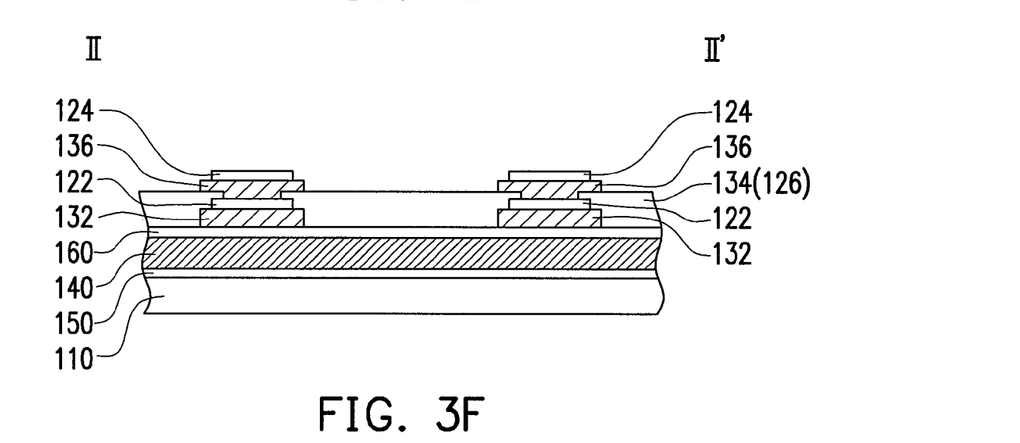
Figure 4F:
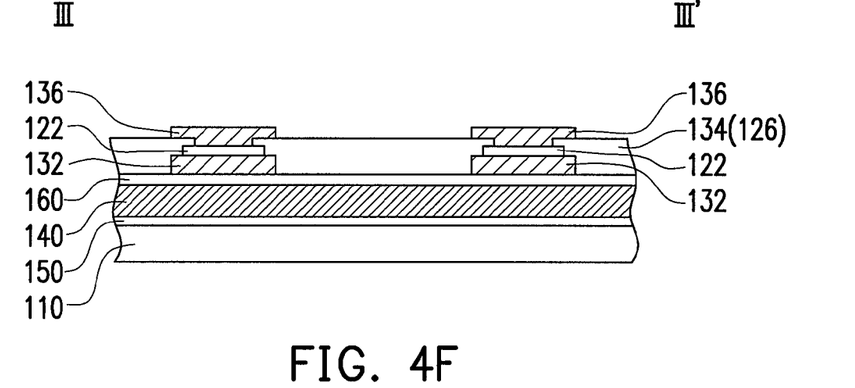

And then, referring to FIG. 2F, FIG. 3F and FIG. 4F, a plurality of second sensing series 124 electrically insulated from each other are formed on the touch-sensing region R1 of the substrate 110. The second sensing series 124 respectively extend from the touch-sensing region R1 of the substrate to the peripheral region R2 so as to cover a portion of the second conductive lines 136, in order that the second conductive lines 136 are electrically connected to the corresponding second sensing series 124, respectively.

It has to be noted that the second sensing series 124 covers a portion of the second conductive lines 136, wherein the portion includes the part where the second conductive line 136 being located in the circuit board attaching zone, i.e., the second sensing series 124 covers a portion of region in which the second conductive lines 136 are located in the circuit board attaching zone.

In the embodiment, one end of the fan-out traces 130 is electrically connected to the touch-sensing circuit 120, and the other end of the fan-out traces 130 is electrically connected to the circuit board attaching zone located on the peripheral region R2, in order that after the substrate 110 and the circuit board are attached with each other, the circuit board is electrically connected to the touch-sensing circuit 120 through the fan-out traces 130. Therefore, the second sensing series 124 cover a portion of the second conductive lines 136 located in the circuit board attaching zone, as shown in FIG. 3F, so that the fan-out traces 130 located in the circuit board attaching zone is electrically connected to the touch-sensing circuit 120. However, on the peripheral region R2 and outside the circuit board attaching zone, the second sensing series 124 do not contact with the circuit board, thus the second sensing series 124 may not cover the portion of the second conductive line 136 correspondingly located outside the circuit board attaching zone, as shown in FIG. 4F.

In the embodiment, the first sensing series 122 and the second sensing series 124 are interlaced, and in other words, the extending direction of the first sensing series 122 and the extending direction of the second sensing series 124 are not parallel. In the preferred embodiment, the extending directions of the first sensing series 122 and the second sensing series 124 are substantially perpendicular, and the first sensing series 122 and the second sensing series 124 are overlapped at the intersection C (as shown in FIG. 1). It should be noted that the second dielectric layer 126 is at least covers the intersections C of the first sensing series 122 and the second sensing series 124, in order to ensure that the first sensing series 122 and the second sensing series 124 are electrically insulated.

In other embodiments, the second dielectric layer 126 may also entirely cover the first sensing series 122, so that the second sensing series 124 are disposed on the second dielectric layer 126 and electrically insulated from the first sensing series 122, and at this time, the first sensing series 122 and the second sensing series 124 are located on different planes. Specifically, the first sensing series 122 are located on the buffer layer 150 and the second sensing series 124 are located on the second dielectric layer 126.

After the forming of the second sensing series 124, fabrication of the touch-sensing circuit 120 is initially completed. In other words, the touch-sensing circuit 120 of the embodiment includes the first sensing series 122 and the second sensing series 124 electrically insulated from each other, and the second dielectric layer 126 disposed at the intersections C of the first sensing series 122 and the second sensing series 124.

The first sensing series 122 and the second sensing series 124 can be transparent conductive sensing series made of the same material including metal oxide material such as indium tin oxide (ITO), indium zinc oxide (IZO), aluminum zinc oxide (AZO), or any other suitable transparent conductive materials.

Figure 2G:
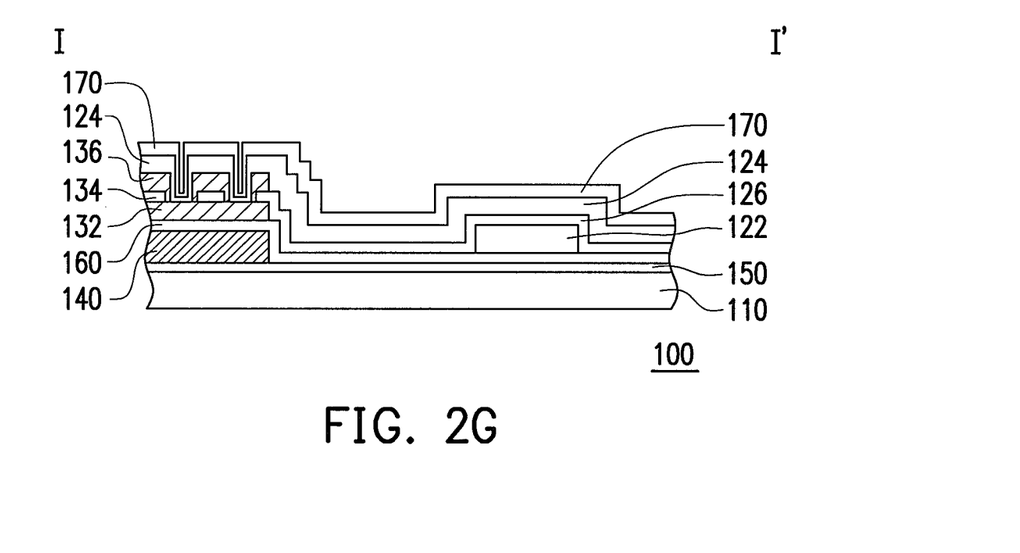
Figure 3G:
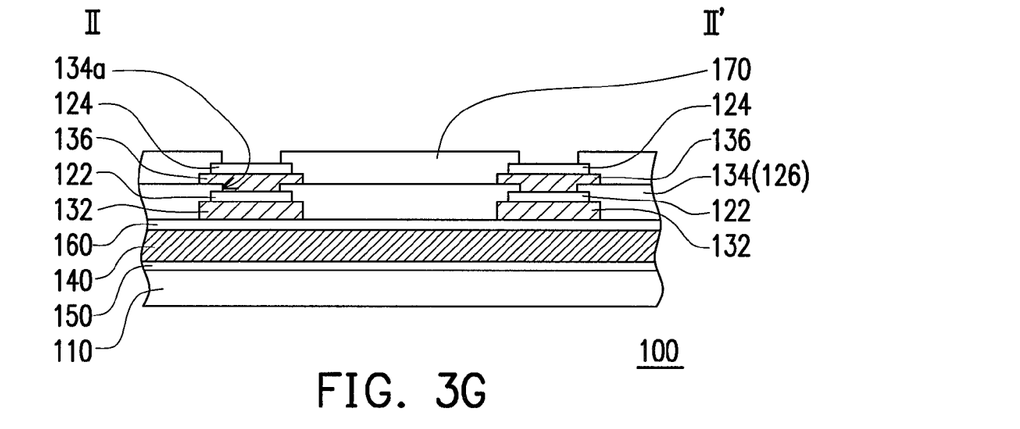
Figure 4G:
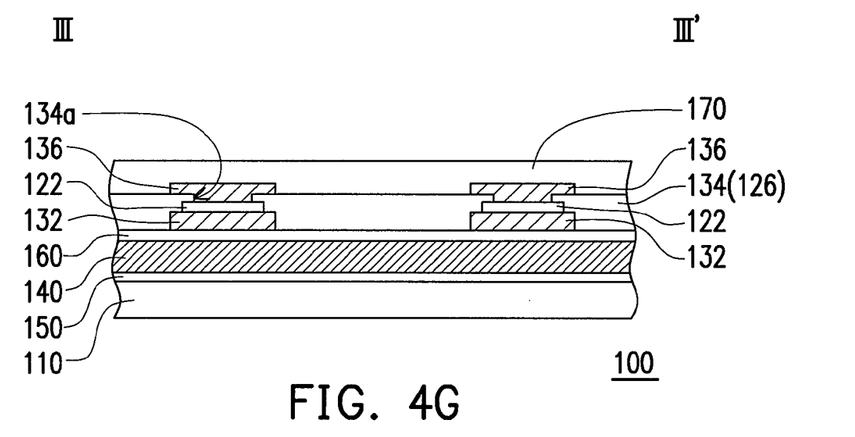

Referring to FIG. 2G, FIG. 3G and FIG. 4G, a protective layer 170 is formed on the substrate 110, so as to cover the touch-sensing circuit 120 disposed on the touch-sensing region R1 and the fan-out traces 130 disposed on the peripheral region R2. In the embodiment, the protective layer 170 does not entirely cover the touch-sensing circuit 1201 and the fan-out traces 130. Openings are disposed at the circuit board attaching zone on the peripheral region R2, in order to expose the fan-out traces 130 and the touch-sensing circuit 120 corresponding to this region, so that after the substrate 110 is attached to the circuit board, the circuit board is electrically connected to the fan-out traces 130 and the touch-sensing circuit 120 through the openings, as shown in FIG. 3G. In the region outside the circuit board attaching zone, the protective layer 170 is disposed, as shown in FIG. 2G and FIG. 4G. However in other embodiments, the protective layer 170 can be fabricated according to actual requirements.

It has to be noted that, although each of the fan-out traces 130 is a double-layered circuit structure including a first conductive line 132 and a second conductive line 136. However, the present invention is not limited thereto. In other embodiments, the fan-out traces 130 may be a triple-layered circuit structure, a four-layered circuit structure or a multi-layered circuit structure, in order to reduce the overall resistance of the fan-out traces.

In light of the foregoing, under the condition of without significantly increasing the manufacturing costs, the resistance of the fan-out traces is effectively decreased and the sensitivity of the touch panel of the present invention can also be greatly improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch panel, comprising:
   a substrate having a touch-sensing region and a peripheral region adjacent to the touch-sensing region;
   a touch-sensing circuit disposed on the touch-sensing region of the substrate; and
   a plurality of fan-out traces disposed on the peripheral region of the substrate and electrically connected to the touch-sensing circuit, and each of the fan-out traces comprising:
   a first conductive line disposed on the peripheral region of the substrate;
   a first dielectric layer disposed on the peripheral region of the substrate to cover the first conductive line, wherein the first dielectric layer has at least one contact window located above the first conductive line; and
   a second conductive line disposed on the first dielectric layer, wherein the first conductive line and the second conductive line of a same fan-out trace are electrically connected to each other through the contact windows, and the first conductive line and the second conductive line which are electrically connected to each other substantially have a same pattern.

2. The touch panel as claimed in claim 1, wherein the touch-sensing circuit comprises:
   a plurality of first sensing series electrically insulated from each other;
   a plurality of second sensing series electrically insulated from each other; and
   a second dielectric layer at least disposed at intersections of the first sensing series and the second sensing series, so that the first sensing series and the second sensing series are electrically insulated.

3. The touch panel as claimed in claim 2, wherein the first dielectric layer and the second dielectric layer are formed by a same material layer.

4. The touch panel as claimed in claim 2, wherein each of the first sensing series extends from the touch-sensing region to the peripheral region to cover a portion of the first conductive lines, and each of the second sensing series extends from the touch-sensing region to the peripheral region to cover a portion of the second conductive lines.

5. The touch panel as claimed in claim 1, further comprising a black matrix disposed on the peripheral region of the substrate, wherein the fan-out traces are disposed on the black matrix.

6. The touch panel as claimed in claim 5, further comprising a buffer layer disposed on the substrate, wherein the black matrix is disposed on the buffer layer.

7. The touch panel as claimed in claim 5, further comprising a third dielectric layer, wherein the third dielectric layer covers the substrate and the black matrix, and the first conductive lines are disposed on the third dielectric layer.

8. The touch panel as claimed in claim 1, further comprising a protective layer covering the touch-sensing circuit and the fan-out traces.

9. The touch panel as claimed in claim 1, wherein the first dielectric layer has a plurality of contact windows located above the first conductive lines to expose two ends of each of the first conductive lines.

10. A fabricating method of a touch panel, comprising:
providing a substrate, wherein the substrate has a touch sensing region and a peripheral region adjacent to the touch sensing region;
forming a plurality of first conductive lines on the peripheral region of the substrate;
forming a plurality of first sensing series electrically insulated from each other on the touch-sensing region of the substrate;
forming a dielectric layer on the peripheral region of the substrate to cover a portion of the first conductive lines, wherein the dielectric layer has at least one contact window located above the first conductive lines;
forming a second sensing series electrically insulated from each other on the touch-sensing region of the substrate, wherein the dielectric layer is at least disposed at intersections of the first sensing series and the second sensing series, so that the first sensing series and the second sensing series are electrically insulated; and
forming a plurality of second conductive lines on the dielectric layer, wherein the first conductive line and the second conductive line of a same fan-out trace are electrically connected to each other through the contact windows, and the first conductive line and the second conductive line which are electrically connected to each other substantially have a same pattern.

11. The fabricating method of a touch panel as claimed in claim 10, wherein the first conductive lines and the second conductive lines are respectively fabricated by a two-step photolithography and etching process, and the two-step photolithography and etching process uses a same photo-mask.

12. The fabricating method of a touch panel as claimed in claim 10, further comprising forming a black matrix on the peripheral region of the substrate, wherein the fan-out traces are disposed on the black matrix.

13. The fabricating method of a touch panel as claimed in claim 12, further comprising forming a buffer layer on the substrate, wherein the black matrix is disposed on the buffer layer.

14. The fabricating method of a touch panel as claimed in claim 10, further comprising forming a third dielectric layer, wherein the third dielectric layer covers the substrate and the black matrix, and the first conductive lines are disposed on the third dielectric layer.

15. The fabricating method of a touch panel as claimed in claim 10, further comprising forming a protective layer covering the touch-sensing circuit and the fan-out traces.

16. The fabricating method of a touch panel as claimed in claim 10, wherein the first dielectric layer has a plurality of contact windows located above the first conductive lines to expose two ends of each of the first conductive lines.

* * * * *